Feb. 15, 1966 E. M. SNYDER 3,234,585
APPARATUS FOR MAKING MOCK CHICKEN LEGS
Filed July 29, 1963 2 Sheets-Sheet 1
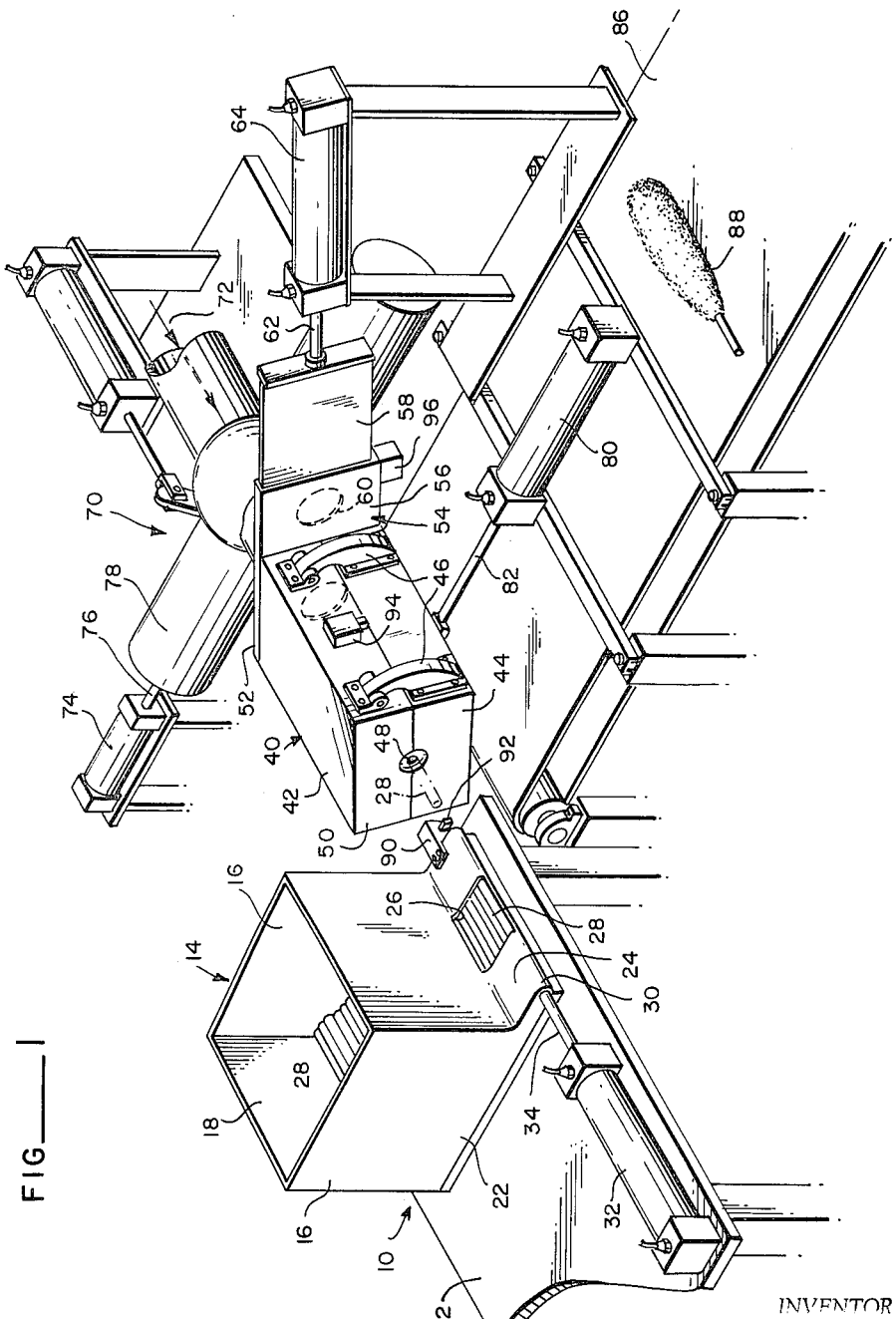
INVENTOR
EDWARD M. SNYDER
BY Tuck & Cole Feb. 15, 1966  E. M. SNYDER  3,234,585
APPARATUS FOR MAKING MOCK CHICKEN LEGS
Filed July 29, 1963  2 Sheets-Sheet 2
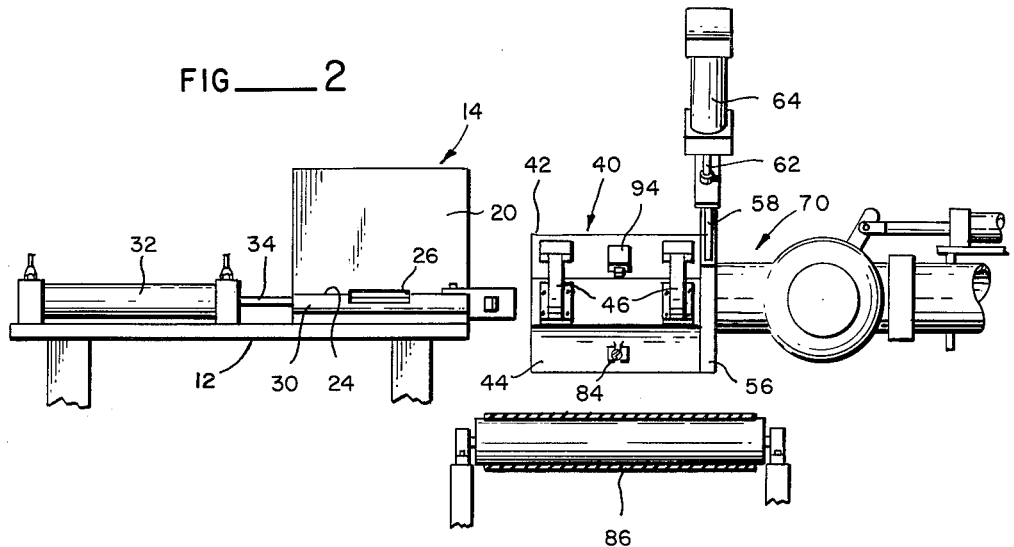
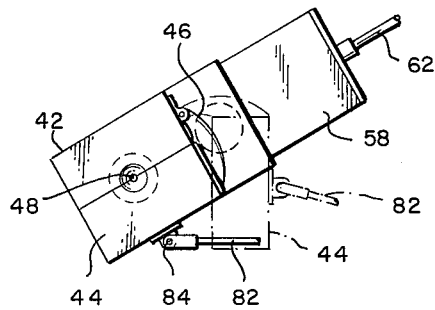
EDWARD M. SNYDER
*INVENTOR*
BY *Tuck & Cole*
ATTORNEYS United States Patent Office 3,234,585
Patented Feb. 15, 1966

3,234,585
APPARATUS FOR MAKING MOCK
CHICKEN LEGS
Edward M. Snyder, Everett, Wash., assignor to Sunnee Brand Meat Company, Inc., Seattle, Wash.
Filed July 29, 1963, Ser. No. 298,145
4 Claims. (Cl. 17—1)

The present invention relates to a machine for preparing ground meat and meat admixtures in specific shapes or forms and applying them to a wooden stick for ready-to-eat consumption. More specifically, this invention relates to a machine which accepts ground meat and admixtures under pressure from a metering device and molds them into appropriate food items of convenient size and shape.

It is well known that a large amount of our meat products are served as snack foods, normally without the benefit of plates or formal table settings. Whether the requirement for pre-prepared and packaged food occurs in the home or at picnics or recreational areas or other places, the increased demand for ready-to-eat snack-type food has made it imperative to have mechanical equipment to produce such food. In the past a great deal of this type of food, particularly where it is to be mounted on a stick, has been hand formed and hand mounted on the stick resulting in extremely high cost per production unit. Not only was the hand labor costly and time consuming, but the product yielded was not uniform. Wide variations would be found in the amount of food used in each unit and the degree of compaction of the food. Furthermore, appearance of the item left much to be desired.

The present machine seeks to overcome the difficulties enumerated above with relation to hand production of ready-to-eat food products, especially the well known meat sticks or mock chicken legs. This invention encompasses a machine which may mold food into any desired shape in uniform amounts and apply it to a stick or skewer at an extremely high rate of speed. During the forming of the meat into its pre-determined shape, as a mock chicken leg for example, the meat is formed around a stick to thereby achieve a good union of the meat with the stick without any danger that the compacted meat might split or rupture during subsequent cooking operations. Essentially, the machine involves the almost simultaneous sequence of operations in which a pre-determined amount of meat is metered under pressure into a pair of forming molds. At the same time and from the opposite end of the molds, a skewer or stick is injected into the mold to receive the meat. As soon as the meat has been metered in, the mold opens and the completely formed meat stick falls out on a conveyor or into a receiving receptacle. The sequence of operations is then repeated.

Accordingly, it is a prime object of this invention to provide a meat stick forming machine which produces individual ready-to-eat meat servings which are skewer mounted for subsequent cooking and consumption.

Another object of this invention is to supply a machine for the simultaneous injection of meat and sticks or skewers into the forming mold for high speed, low cost production.

Still another object of this invention is to provide a meat stick forming machine which accurately measures pre-determined amounts of ground meat and admixtures thereof into a forming mold at a high rate of speed.

Yet another object of this invention is to provide a meat stick forming machine in which the molds may be designed to be formed into any desirable shape or configuration.

A further object of this invention is to supply a meat forming machine which eliminates costly, complicated equipment and which is extremely simple in design and economical to produce.

Other features, advantages and capabilities of this machine will be apparent from the following description and disclosure and the appended drawings forming a part, hereof.

In the drawings:

FIGURE 1 is a perspective view of one embodiment of this machine;

FIGURE 2 is a side elevational view of the machine shown in FIGURE 2; and

FIGURE 3 is a partial and elevational view of the molds as they are mounted in the machine, FIGURES 1 and 2.

Referring now to the drawings, it will be seen that like parts have like reference numbers throughout. While the specific manner of supporting the various parts of the machines is optional, the general arrangement of the parts should be similar to that suggested by the drawings. The machine is assembled on one side with a stick feeding mechanism generally referred to by the number 10. The stick feeding mechanism has a supporting surface 12 and a stick or skewer hopper 14. Hopper 14 has side walls 16, rear wall 18 and front wall 20. It will be seen that the hopper 14, in top plan view, is essentially square or rectangular.

The bottom wall of the hopper 22 is inclined downwardly from back to front. The lower front wall edge or margin of the hopper is provided, with an elongated opening extending entirely across the front and which is only deep enough to permit a single stick or skewer to pass therethrough. A shallow trough 24 in the form of an outwardly extending passage is built outwardly from said opening. The trough or passage 24 is dimensioned to permit only a single layer of sticks therein and is covered and provided with rectangular groove 26 for observation of the sticks in the trough and for convenient insertion of the fingers in case the sticks or skewers 28 have to be straightened. The outer rounded end 30 of said trough 24 accommodates a single stick which is axially aligned with a cylinder 32 having a piston rod or plunger 34. The cylinder and plunger 34 are positioned so that the plunger when forced outwardly will drive the end stick out of the trough and into the mold in a manner to be described hereinafter. The hopper will usually be furnished with a vibrating device (not shown) for the bottom wall thereof to keep sticks flowing into the trough.

A molding head, generally designated as 40, is located to receive the sticks or skewers 28 from the stick hopper side of the head and to receive meat from the other side. Thus, the mold head 40 has hopper end 50 and metering end 52. The molding head 40 has individual mold halves made up of the stationary or upper mold 42 and the lower or movable mold 44. The molds are pivotally secured together by hinges 46. Note that the movable mold 44 is hinged so that it swings away from the top mold as well as pivoting with respect to it.

A hole or insert port 48 is formed into the center of the mold head on the end nearest the hopper 14.

Mold head metering end 52 has a knife or blade structure 54 for closing and opening the entrance to the interior of the molds. Essentially, said blade structure is comprised of a housing 56 and a blade 58. Blade 58 has an orifice 60 formed therein and is located so that it is normally disposed away from the molds.

The blade is attached to piston rod 62 of cylinder 64 which in turn is mounted on an appropriate support structure. The rod 62 when retracted holds blade 58 in its normal position. When the rod is extended the orifice 60 is pushed into alignment with appropriate openings between the metering device and the molds.

A conventional meat metering device, generally shown by reference numeral 70 and for which no specific claim is made, is disposed on the side of the blade opposite the molds. Meat is brought into the metering device as shown by arrow 72 and injected into the molds in a pre-determined sequence of operations and in pre-determined quantities. Suffice it to say that cylinder 74 through piston rod 76 operates elements in the metering chambers included in housing 78 of metering device 70.

The lower or movable mold 44 is swung about hinges 46 by cylinder 80 which has rod 82 pivotally connected to said mold as at 84 (see FIGURE 3). A conveyor, shown as continuous belt 86 for illustration only, is disposed below the mold head as closely as possible without actually interfering with the swing of the lower mold half 44. Said conveyor 86 is the means by which the meat sticks 88 are moved away from the machine after they have been formed. A stationary receptacle could be placed beneath the mold head to receive the meat sticks as they are discharged. The method of operation of the machine is accomplished through a pre-determined programed sequence of operations involving for purposes of illustration well known electrical features. A bracket 90 supports a first microswitch 92. As the cycle of operations begins with the actuation of cylinder 32 to plunge a stick 28 into the hold head 40, the stick emerging from the trough 24 trips microswitch 92 to start a first time delay mechanism, not shown. The first time delay through solenoid operated valves in turn activates cylinder 64 to move blade 58 which opens the passage between the molds and the metering mechanism. A second microswitch 96, located so as to be activated by movement of blade 58, in turn activates the metering device 70 to inject the metered amount of meat into the mold.

As the first time delay period ends, the blade 58 retracts to close the opening. As the blade retracts the microswitch 96 is returned to its off position and the circuit for the metering mechanism is opened. In this way a built-in safety feature is achieved. As the first time delay mechanism finishes its cycle, it activates a second time delay device which opens the molds and retracts the stick feed plunger. The third microswitch 94 secured to the molds prevents the plunger 34 from feeding a stick to the mold head as long as the molds are open. Thus, said switch 94 also serves as a safety feature. When the second time delay device reaches the end of its cycle it reenergizes the stick feed solenoid and thus begins the programmed sequence anew.

The molds, as mentioned above, are conventional and may have the cavities thereof formed in any desirable shape. The body of each mold surrounding the mold cavity will contain a heating element since it has been found desirable to employ heat for most advantageously forming and discharging the completed meat sticks. It should be understood that the molds do not have to be mounted, opened, and operated as shown.

The foregoing is considered as illustrative only of the principle of this invention. Numerous modifications and changes will occur to those skilled in the art and hence it is not desired to limit the invention to the exact method and structure shown and described. Accordingly, all suitable modifications and equivalents may be restored to falling within the scope of the invention.

What is claimed is:

1. A machine for making mock chicken legs comprising: (a) a hopper means including an elongated opening on the outside of which is constructed a trough means for receiving sticks moving from inside said hopper through said opening, (b) a reciprocating plunger means generally coaxially aligned with the outermost stick position in said trough means, (c) a mold head means having a mold cavity therein and having a first mold portion and a second mold portion which together define said cavity, said mold head being positioned so as to have one end thereof located in spaced relation to the side of said trough means opposite said plunger means, said mold head having a port means centered in said end thereof and aligned with said outermost stick position for receiving a stick means from said trough means and holding it centered in said mold cavity, (d) food metering means attached to the opposite end of said mold head and adapted to inject a predetermined quantity of meat into said cavity, (e) actuating means attached to said mold head for opening and closing said mold head, (f) actuating means connected to said plunger means for simultaneously injecting a stick means into said port means and mold cavity with injection of meat into said cavity.

2. A machine for making mock chicken legs comprising: (a) a hopper means having a generally downwardly sloping bottom wall and including an elongated opening on the outside of which is constructed a trough means for receiving sticks moving from inside said hopper through said opening, (b) a reciprocating plunger means generally coaxially aligned with the outer most stick position in said trough means, (c) a mold head means having a mold cavity therein and having an upper stationary mold portion and a lower movable mold portion hingedly secured to said upper mold portion, said mold head being positioned so as to have one end thereof located in spaced relation to the side of said trough means opposite said plunger means, said mold head having a port means centered in said one end thereof and aligned with said outermost stick position for receiving a stick means from said trough means and holding it centered in said mold cavity, (d) food metering means attached to the opposite end of said mold head, (e) a second actuating means attached to said movable mold portion for opening and closing said mold head, and (f) actuating means connected to said plunger means for simultaneously injecting a stick means into said port means and mold cavity with injection of meat into said cavity.

3. A machine for making mock chicken legs comprising: (a) a hopper means having side, front and rear walls and having a bottom wall generally downwardly inclined from rear to front, the lower margin of the front wall being provided with an elongated opening on the outside of which is constructed a trough means for receiving sticks moving from inside said hopper through said opening, (b) a first cylinder means mounted to one side of said trough means and having a plunger means generally coaxially aligned with the outer most stick position in said trough means, (c) a mold means having a mold cavity therein and having an upper stationary mold portion and a lower movable mold portion hingedly secured to said upper mold portion, said mold head being positioned so as to have one end thereof located in spaced relation to the side of said trough means opposite said first cylinder means, said mold head having a port means centered in said one end thereof and aligned with said outermost stick position for receiving a stick means from said trough means and holding it centered in said mold cavity, (d) food metering means attached to the opposite end of said mold head and (e) a second actuating means attached to said movable mold portion for opening and closing said mold head.

4. A machine for molding food on a stick, comprising: (a) a stick hopper means including a trough means for receiving sticks from said hopper, (b) a reciprocating plunger means generally coaxially aligned with the outermost stick position in said trough means, (c) a mold head means having a mold cavity therein, said mold head and said cavity being defined by a first stationary mold portion and a second movable mold portion, said mold head in its closed state being positioned so as to have one end thereof located in spaced relation to the side of said trough means opposite said plunger means, said first and second mold portions together defining a port means centered in said one end thereof and aligned with said plunger means and said outermost stick position for receiving a stick means from said trough means and holding it centered in said mold cavity, (d) food metering means attached to the opposite end of said mold head and adapted to inject a predetermined quantity of meat into said cavity, (e) actuating means attached to said second mold portion for opening and closing said mold head and (f) actuating means connected to said plunger means for simultaneously injecting a stick means into said port means and mold cavity with injection of meat into said cavity.

References Cited by the Examiner
UNITED STATES PATENTS

| | | | |
|---|---|---|---|
| 1,052,519 | 2/1913 | Schabacker et al. | 107—8 |
| 1,692,559 | 11/1928 | Miller | 107—8 |
| 1,778,485 | 10/1930 | Davidson | 99—107 |
| 2,303,566 | 12/1942 | Majestic | 17—1 |
| 2,609,564 | 9/1952 | Grimm | 17—1 |
| 2,733,153 | 1/1956 | Hammerberg | 99—194 |
| 3,099,037 | 7/1963 | Blake et al. | 18—1 |

SAMUEL KOREN, *Primary Examiner.*

HYMAN LORD, LUCIE H. LAUDENSLAGER,
*Examiners.*